(12) United States Patent
Nations, Jr. et al.

(10) Patent No.: US 9,261,208 B1
(45) Date of Patent: Feb. 16, 2016

(54) ANTI-ROTATION TUBULAR CASING CONNECTION AND THREADED PIPE CONNECTOR

(71) Applicant: PRECISION COUPLINGS, LP, Houston, TX (US)

(72) Inventors: Michael Keith Nations, Jr., Houston, TX (US); Michael Paul Kirchner, Houston, TX (US)

(73) Assignee: PRECISION COUPLINGS, LLC, Houston, TX (US)

( * ) Notice: Subject to any disclaimer, the term of this patent is extended or adjusted under 35 U.S.C. 154(b) by 0 days.

(21) Appl. No.: 14/618,920

(22) Filed: Feb. 10, 2015

Related U.S. Application Data

(60) Provisional application No. 62/091,326, filed on Dec. 12, 2014.

(51) Int. Cl.
| | |
|---|---|
| *F16L 35/00* | (2006.01) |
| *F16L 15/00* | (2006.01) |
| *F16L 15/06* | (2006.01) |
| *E21B 17/02* | (2006.01) |

(52) U.S. Cl.
CPC ............... *F16L 15/00* (2013.01); *E21B 17/02* (2013.01); *F16L 15/06* (2013.01)

(58) Field of Classification Search
CPC ....... F16L 15/00; F16L 15/001; F16L 15/002; F16L 15/006; F16L 15/007; F16L 15/008; E21B 17/02; E21B 17/04
USPC ............. 285/333, 334.3, 334.4, 334.2, 334.1, 285/334; 166/242.1, 242.2, 242.6
See application file for complete search history.

(56) References Cited

U.S. PATENT DOCUMENTS

| | | | |
|---|---|---|---|
| 1,889,870 A * | 12/1932 | Montgomery | ................ 285/333 |
| 2,772,102 A | 11/1956 | Webb | |
| 4,244,607 A | 1/1981 | Blose | |
| 4,373,750 A | 2/1983 | Mantelle et al. | |
| 4,588,213 A | 5/1986 | Bollfrass et al. | |
| 4,614,120 A | 9/1986 | Fradin et al. | |
| 4,629,223 A | 12/1986 | Dearden et al. | |
| 4,762,344 A | 8/1988 | Perkins et al. | |
| 4,962,579 A | 10/1990 | Moyer et al. | |
| 5,348,350 A | 9/1994 | Blose et al. | |
| 5,498,035 A | 3/1996 | Blose et al. | |
| 5,709,416 A | 1/1998 | Wood | |
| 6,406,070 B1 * | 6/2002 | DeLange et al. | ............. 285/333 |
| 6,817,633 B2 | 11/2004 | Brill et al. | |
| 2006/0220382 A1 * | 10/2006 | Reynolds et al. | ............. 285/333 |

OTHER PUBLICATIONS

Tables E.2 and E.5 taken from API Specification 5CT, 9th Edition, Jun. 2011, "Specification for Casing and Tubing"; published by American Petroleum Institute, Jun. 2011; www.api.org/publications.*

* cited by examiner

*Primary Examiner* — James Hewitt
*Assistant Examiner* — Jay R Ripley
(74) *Attorney, Agent, or Firm* — Buskop Law Group, PC; Wendy Buskop

(57) ABSTRACT

A threaded casing connection and a thread pipe connector for connecting casing segments or tubing segments joined using a threaded connection. The threaded connection having a threaded coupling for engaging a mill end connector and a field end connector. The threaded connector has a metal barrier for accommodating any phase difference and length of the screw thread helices which limit the axial advancement of each pin connector with the threaded coupling.

9 Claims, 5 Drawing Sheets

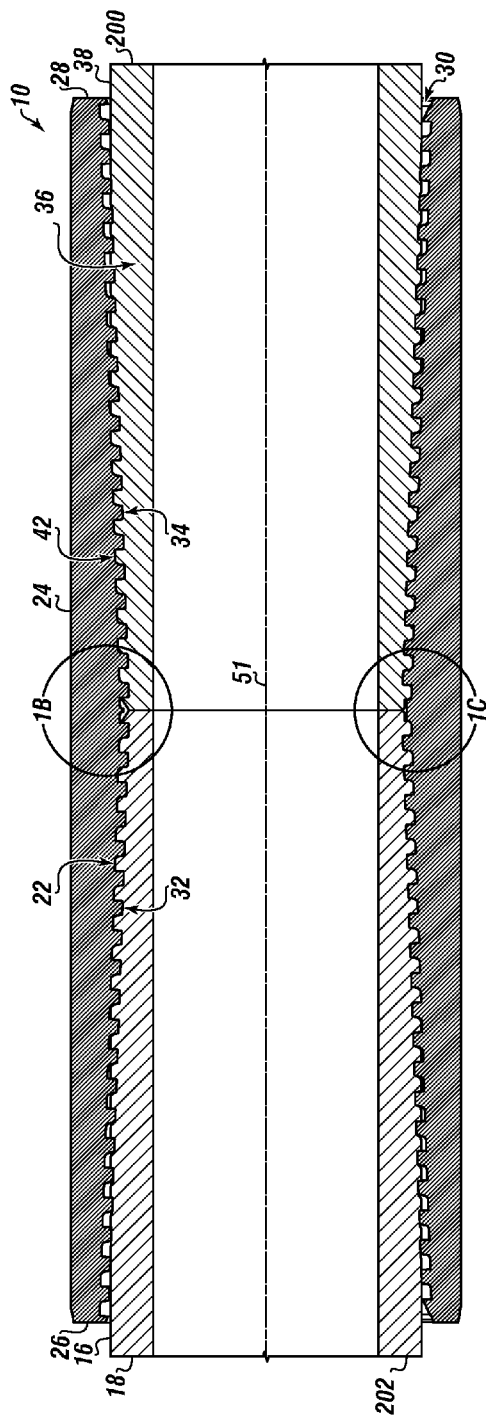
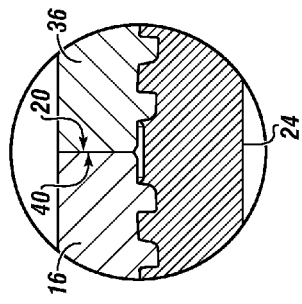
FIGURE 1C
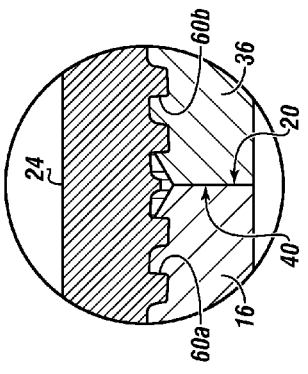
FIGURE 1B
FIGURE 1A

ANTI-ROTATION TUBULAR CASING CONNECTION AND THREADED PIPE CONNECTOR

CROSS REFERENCE TO RELATED APPLICATION

This application claims priority to and the benefit of U.S. Provisional Patent Application Ser. No. 62/091,326 filed Dec. 12, 2014, entitled "COUPLING WITH ANTI-ROTATION ELEMENT." This application is incorporated herein in its entirety.

FIELD

The present embodiments generally relate to a threaded tubing connection or threaded casing connection, made up of a threaded coupling, for use joining pipe or tubulars, such as pipe used in drill strings, drilling with casing, or production tubing.

BACKGROUND

A need exists for a threaded pipe connection with an anti-rotation element to prevent or limit axial advancement of a pin connector into a threaded coupling past a predetermined position.

The present embodiments meet these needs.

BRIEF DESCRIPTION OF THE DRAWINGS

The detailed description will be better understood in conjunction with the accompanying drawings as follows:

FIG. 1A is a cross sectional view of the threaded connection according to one or more embodiments.

FIG. 1B is a detailed view of the threaded connection according to one or more embodiments.

FIG. 1C is a detailed view of the threaded connection according to one or more embodiments.

Figure 1D:
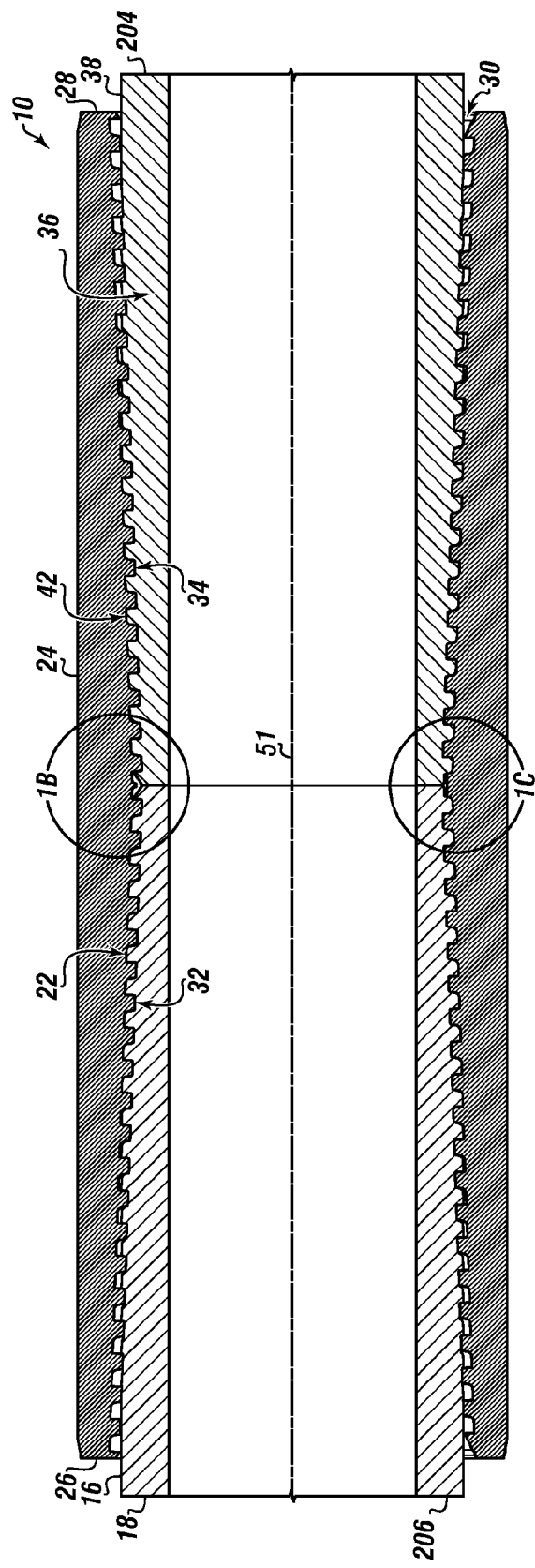
FIG. 1D is a cross sectional view of a threaded pipe connection according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a threaded casing connection for coupling adjacent casing segments together to form a casing string.

The embodiments relate to a threaded pipe connection for coupling adjacent pipe segments together to form a tubing string.

The embodiments relate to a coupled pin nose to pin nose connection that uses a buttress thread. The pin noses are designed to be at the center of the coupling, each pin nose experiencing the same tolerance.

The embodiments prevent misalignment of tubular connections in the field, which can cause the coupling to spin before the pin noses, making contact during normal drill string make up prior to inserting connected tubulars down a wellbore.

The threaded casing connection and the threaded pipe connection, each prevent liquid leaking, thereby preventing toxic spills by providing a dual sealing and load transferring connection.

The embodiments prevent or limit over tightening by the pin nose in the threaded casing connection and threaded pipe connection by limiting the axial advancement of the mill end pin connector or axial advancement of the field end pin connector into a threaded coupling, thereby preventing the threaded coupling from splitting open.

Threaded couplings where the field end pin end and mill end pin end abut directly at a midpoint have a tendency to turn during installation of the field end pin connector.

Excessive turning can cause leaks and splitting in threaded couplings. The turning generally occurs because the equipment that rotates the grips on the tubing segment or casing segment and not on the coupling.

The embodiments allow for a quicker installation together of casing segments or tubing segments in the field with less time spent on repositioning threaded couplings turned past center.

The embodiments provide a method for anti-rotation that does not add hoop stress to the threaded coupling that could accelerate corrosion and lead to premature failure.

The embodiments provide extra torque resistance, when the torque is applied to the casing or tubing segment, exceeds the yield torque of the threaded connection.

The embodiments further relate to a coupling element that has a special design to limit coupling turning for buttress couplings which have been threaded to the center of couplings since their inception.

Traditionally, the center of a coupling was of little concern since the pin threads were not expected to advance to a midpoint or past a midpoint. Traditionally, the tool forming the buttress threads is pulled out to prevent creation of a sharp imperfect thread in the coupling midpoint.

A benefit of the present embodiments is that it helps securely fasten the mill end and field end pin connections by limiting the rotation of the threaded coupling when the field ends are misaligned.

The coupling threads can be formed so that an identical pin will be out of lead by 180 degrees or in perfect lead. This increased versatility is of tremendous value in the field.

This invention controls the lead between the threads on two ends and has an element in the center of the coupling that resists the pins movement past the center. When the pin is threaded past the center, it runs into a metal barrier. The metal barrier requires increased torque to cause further advancement, which effectively stops "over" torqueing of the pin nose.

A relief groove also allows the pin noses, which may not always be dead center in the coupling to move freely by a controlled amount.

A benefit of the invention is that in embodiments, the invention includes a metal barrier which assists in controlling or mitigating split couplings when the coupling is over-torqued. The tendency of the connection to turn is reduced by half a turn by controlling the lead between the threads on each end. Controlling the lead is needed because the imperfect threads on the pin nose are free to move with respect to one another.

The embodiments relate to a threaded casing connection for coupling adjacent casing segments together to form a casing string, the casing segments are supported by a drilling rig, a production rig, a workover rig or a wellhead for placement in a wellbore.

The threaded casing connection can have a first casing segment, a second casing segment, wherein each of the casing segments can have a first end, a second end, and a passage therethrough, and further wherein each of the casing segments can have a wall thickness of 0.1 inch to 1 inch.

In embodiments, a mill end pin connector can comprise a mill end casing end, a mill end pin end having either a cone shape reducing in diameter along a longitudinal axis of the mill end pin connector toward the mill end casing end or a cylindrical shape, and a mill end screw thread formed on the mill end pin end creating a plurality of mill end teeth that are identically spaced apart.

The threaded connection can have a threaded coupling receiving the plurality of pin mill end teeth from the mill end pin connector.

The threaded coupling can have a coupling mill end face, a coupling field end face, a threaded coupling bore reducing in diameter from a first large diameter at the coupling mill end face to a small diameter at a coupling midpoint and then increasing to a second large diameter at the coupling field end face, coupling mill end teeth formed helically along the threaded coupling bore from the coupling mill end face to a location proximate the coupling midpoint, wherein the coupling mill end teeth are for receiving the mill end teeth, and a plurality of coupling field end teeth formed helically along the threaded coupling bore from the coupling field end face to the location proximate the coupling midpoint.

The threaded connection can have a field end pin connector having a field end casing end, a field end pin end having either a cone shape reducing in diameter along a longitudinal axis of the field end pin connector toward the field end casing end or a cylindrical shape.

A field end screw thread formed on the field end pin end creating field end teeth that are identically spaced apart and adapted to engage the mill end teeth, wherein the threaded casing connection couples adjacent casing segments together to form a casing string capable of supporting at least 10,000 pounds of load without deforming.

The embodiments relate to a threaded pipe connection for coupling adjacent pipe segments together to form a tubing string, the pipe segments are supported by a drilling rig, a production rig, a workover rig or a wellhead for placement in a wellbore.

The threaded pipe connection can have a first pipe segment and a second pipe segment.

Each of the segments can have a first end, a second end, and a passage therethrough, wherein each of the segments has a wall thickness of 0.1 inch to 1 inch.

The threaded pipe connection couples adjacent tubing or pipe segments together to form a tubing string capable of supporting at least 10,000 pounds of load without deforming.

The following terms are used herein:

The term "box thread" as used herein can refer to the internal thread of a box connector. The box thread can have a load flank, a stab flank, a root, and a crest. A box thread can be a female threaded fastener for joining to male threads.

The term "buttress connection" can refer to a thread form for screw treads defined by American Petroleum Institute Specification API 5-B described in the 15th edition of API, April 2008.

The term "center line" as used herein can refer to center line of the threaded connection, which can be the same as the longitudinal axis of the pipe or tubular being engaged by the threaded coupling.

As used herein the term "coupling mill end teeth" can refer to a female threaded portion of a threaded coupling which can be made up of internal screw threads in a helical configuration. It can refer to a female threaded fastener for joining to male threads. The coupling mill end teeth can engage a mill end pin connector. The coupling mill end teeth can be formed on a tubular. Each thread tooth can have a load flank, a stab flank, a crest and an adjacent root.

As used herein the term "coupling field end teeth" can refer to a female threaded portion of a threaded coupling which can be made up of internal screw threads in a helical configuration. It can refer to a female threaded fastener for joining to male threads. The coupling field end teeth can engage a field end pin connector. The coupling mill end teeth can be formed on a tubular. Each thread tooth can have a load flank, a stab flank, a crest and an adjacent root.

As used herein the term "a coupling field end face" can refer to the plane at the end of the tubular. The plane can resemble the circular top or bottom of a cylinder. It can be proximate to where the screw threads start.

The term "coupling midpoint" as used herein can refer to the midpoint along the length of the threaded coupling in the axial direction. A threaded coupling is formed on pipe or tube or casing string and has an axial direction similar to a cylinder. The pin connectors can abut at the coupling midpoint in this invention. Both faces of the pin connectors can abut at the coupling midpoint.

As used herein the term "a coupling mill end face" can refer to the plane at the end of the tubular. This side of the threaded coupling can receive the mill end pin connector. The plane can resemble the circular top or bottom of a cylinder. It can be proximate to where the coupling mill end teeth start.

The term "crest" as used herein can refer to the apex of the thread form of the invention, such as a buttress thread form. The apex or crest, for example for a buttress thread form, can be considered to be trapezoidal in shape, such as square or rectangle.

Every matched pair of screw threads, external and internal, can be described as "female" and "male". A screw has male threads formed on its outer surface while its matching hole has female threads.

As used herein the term "field end pin connector" can refer to a pin connector that is used by a customer to joining the field end pin connector with the field end of the threaded coupling.

The term "field end screw thread" can refer to a thread formed on a cone shaped field end pin end or a cylindrical shaped field end pin end. The field end screw threads create field end teeth that are identically spaced apart and adapted to engage the mill end teeth.

As used herein the term "field end tubular end" can refer to an end of a piece of pipe that is typically threaded using male threads. This is the end that the customer uses to join two pieces of pipe or two pieces of tubular together.

The term "first large diameter" as used herein can generally be about 2 percent to 15 percent larger than the small diameter near a coupling midpoint. As an example, the large diameter tapers from 5.5 inches and tapers down to 5.25 at the coupling midpoint. In other embodiments, the large diameter can be 13 inches and ⅜ of an inch, and tapers down to a small diameter, such as 12 inches and ⅞ of an inch at the coupling midpoint. In embodiments, the first large diameter and the second large diameter can be identical. In other embodiments, the first large diameter can be from 15 percent to 5 percent larger than the second large diameter or visa versa.

The term "flank angle" as used herein can refer to an angle of either a stab flank or a load flank. The flank angle can refer to an acute angle in a plane coinciding with a longitudinal axis, measured between a flank of a coupling thread tooth or a flank of a pin connector and a plane positioned 90 degrees to the longitudinal pipe axis. The flank angle being positive or "a plus number" and if the flank faces toward the crest, the flank angle being minus or "a negative number" if the flank faces toward the root.

The cross-sectional shape of a thread is often called its "form" or "threadform" (also spelled thread form). The term "threadform" as used herein can be square, triangular, trapezoidal, or other shapes. The terms form and threadform can refer to all design aspects taken together (cross-sectional shape, pitch, and diameters).

The term "handedness" as used herein can be composed of "right handed" and "left handed" and is used when referring to threads or helical paths, such as helical path handedness. "Handedness" is a description of the two possible directions the helix of the thread can be configured. Most screw threads are oriented so that when seen from a point of view on the axis through the center of the helix, they appear to move away from the viewer when it is turned in a clockwise direction and move toward the viewer when it is turned counter clockwise. This orientation is known as a right handed thread, because the thread follows the right hand grip rule. Screw threads oriented in the opposite direction are known as left handed thread.

The term "helix," "helical path" or "helically" as used herein can refer to a curve in three dimensional space. One example can be a coiled spring. The helix or helical shape can be a repetitive pattern that has lead, taper, handedness, a start point an end point and length. The start point and end point can have a diameter or radius, a direction and length between the two points. When viewed in a two dimensional view from the side it resembles a sinusoidal wave. When viewed from the top or bottom it can appear as a circle or spiral. A helical path length can be measure in inches, and in an example can be 5 inches or 15 inches in length.

The term "in phase" as used herein can refer to when a point on the box thread roots are an exact multiple of the axial distance defined as lead. To use the wave analogy, the peaks and valleys are aligned. If the end points of two identical thread helices are joined they are in phase. A helix is in phase if the end points are joined in three dimensional space. An example can be two identical spring coils fused together on an end point so that they appear as one continuous spring. When viewed from the side they appear as one continuous coil.

The term "lead" as used herein can refer to the axial advance of a helix or screw during one complete turn (360 degrees). The lead for a screw thread is the axial travel for a single revolution. It is also the distance from a point on the thread crest to the same point on the adjacent thread crest. It is typically expressed in inches.

The term "load flank" as used herein can refer to the portion of the screw thread that conjoins and transfers axial tension loads after the male and female screw threads are mated. The load flank can be a surface of the thread tooth opposite the stab flank. An example of an axial tension load is 500 pounds of force.

The term "metal barrier" as used herein can refer to the area located at the coupling midpoint that remains untouched by the screw thread cutting tool. The width of the "metal barrier" can be controlled by controlling the phase difference and length of each helical thread. The untouched area in conjunction with the phase difference of the pair of helical threads acts to prevent axial advancement of either field end or mill end pin connectors.

As used herein the term "mill end" can refer to the side of the threaded coupling and the mill end pin connector joined together by the manufacturer at the mill. Pipe and the threaded coupling are typically sold and transferred as a single unitized piece. After assembly the pipe or tubular can have one end that has male screw threads known as a field end pin connector and another end with female screw threads known as a coupling field end.

As used herein the term "a mill end pin connector" can refer to a pin connector that is assembled by the manufacturer by joining the mill end pin connector with the mill end of the threaded coupling.

The terms "a mill end pin end or field end pin end" as used herein can refer to the front of a tube or pipe with male screw threads. The pin end lies on the same plane as the circular face of the tube or pipe. When joined by the threaded coupling of this invention, the mill end pin end is in direct contact with the field end pin end.

As used herein the term "a mill end tubular end" can refer to an end of a piece of pipe that is typically threaded using male threads. The manufacturer typically joins this end to the threaded coupling prior to sale to a customer or other end user.

As used herein the phrase "mill end screw thread" refers to threads formed on a cone shaped mill end pin end or cylindrical shaped mill end pin end. The mill end screw thread creates mill end teeth that are identically spaced apart.

The term "pin field end teeth" of the field end pin connector refers to the formed plurality of teeth, each tooth having a root, a crest, a lead, a stab flank and a load flank created by a helical path formed on the field end pin connector.

The term "pin mill end teeth" of the mill end pin connector refers to the formed plurality of teeth, each tooth having a root, a crest, a lead, a stab flank and a load flank created by a helical path formed on the mill end pin connector.

The term "phase" as used herein can refer to the relative position of the box threads on one end of the coupling as compared to the opposite end. The term "phase" can be commonly used in sinusoidal or wave functions which are similar to threads because they have a repetitive pattern of peaks "crests" and valleys "roots".

The term "phase difference" as used herein can refer to the amount by which the roots of the formed threaded coupling teeth are out of phase with each other and can be expressed in degrees, such as from 0 degrees to 360 degrees, in radians from 0 to $2\pi$, or in fractions of lead. If the phase difference is 180 degrees, then the roots of the formed threaded coupling teeth will be a multiple of ½ the lead distance and not a multiple of the full lead distance.

To use the spring coil analogy a phase difference will separate the end points of the spring coil so they do not appear as a continuous sinusoidal wave from the side. In three dimensional space this phase difference creates a gap between the end points of the helix.

As used herein the term "pin connector" can refer to the male threaded portion of a threaded casing connection or the threaded pipe connection which is made up of external threads in a helical configuration. The pin connector can engage a box connector. The pin connector can be formed on a pipe or another piece of steel that is round and has a conduit therein, such as a tubular. As used herein the tubular can be composed of a pin connector on both ends of the tubular. A coupling can be installed by the manufacturer on a single end of the tubular. Once the coupling is unitized with the tubular the assembly can have a pin connector on one end and a box connector for receiving the pin connector of a second tubular.

The term "pin thread" as used herein can refer to an external thread of a pin connector. The pin thread can have a load flank, a stab flank, a root and a crest. A pin thread can be commonly referred to as a male member that joins to a female thread, usually in a threaded configuration.

The term "pitch" can be defined as the axial distance between adjacent threads on a helix or screw. Lead and pitch can sometimes be used interchangeably. Pitch is sometimes expressed in inches or as the number of threads contained in one inch. For example, 5 threads per inch or 0.200 of an inch.

The term "relief groove" as used herein can refer to a groove formed at the coupling midpoint. The relief groove can be in the form of an isosceles trapezoid. The relief groove functions to reduce the coupling hoop stress if the pin end is screwed past the coupling midpoint. The hoop stress is caused by pin thread tooth contact with the threaded coupling.

The term "root" as used herein can refer to the valley portion of the thread form of the invention, which can be a buttress thread form. The valley for the thread form can be trapezoidal in shape, such as a square or rectangular.

The term "screw thread" as used herein can refer to a helical structure used to convert between rotational and linear movement. A screw thread can be a ridge wrapped around a cylinder or cone in the form of a helix, with the former called a straight thread and the latter called a tapered thread. A screw thread is the essential feature of the screw as a simple machine and also as a fastener. A screw thread is typically formed using a cutting tool that follows a helical path around a cylinder or cone. The cutting tool has the cross sectional shape of the thread on its cutting surface.

The term "stab flank" can refer to a surface of the thread tooth that conjoins and transfers compressive axial loads after the male and female screw threads are mated. The stab flank acts to restrict the axial movement of the threaded casing connection or the threaded pipe connection when the male and female threads come into contact with each other. An example of an axial load transferred could be 500 pounds of force.

The term "tubular" or "tube" as used herein can refer to pipe or other hollow shapes which can be cylindrical and used to convey gas or fluids.

The term "threaded casing connection or threaded pipe connection" as used herein can refer to the combination of a mill end pin connector, a threaded coupling and a field end pin connector, wherein one of the connections is used for casing and one of the connections is used for pipe.

The threaded casing connection and the threaded pipe connection are used for connecting together tubulars, pipes, tubes, or other similar conduits. Threaded casing connection or the threaded pipe connection are particularly usable for creating casing strings, wellbore liners, tubing strings, and pipe joints.

The term "threaded coupling" as used herein can refer to the mechanical device for joining two male threaded fasteners. The threaded coupling will be used to join separate tubulars. In some instances, the threaded coupling is known as an extension nut or coupling nut. A threaded coupling is integrally formed on pipe or tube or casing or liners or a drill string and can be made up of coupling mill end teeth and coupling field end teeth. The coupling field end teeth are female threaded screw threads are formed on opposite ends of a threaded coupling. A threaded coupling can be used to join a mill end pin connector with a field end pin connector. One major difference between a nut and the threaded coupling is that the helix is right handed on both ends and not continuously threaded through. Both screw thread helices end proximate a coupling midpoint in this invention.

The term "threaded coupling bore" as used herein can refer to the inner diameter surface of the threaded coupling which has formed on it the coupling mill end teeth and coupling field end teeth.

The term "thread tooth" as used herein can refer to the portion of the screw threads which remains after a groove has been cut in material forming the screw thread, such as by a threading tool. The "thread tooth" can have three sides, a stab flank, a crest and a load flank and an adjacent root. It is a term that can be shared by both male and female screw threads.

The term "taper" as used herein can refer to an angle forming a trajectory along which the thread tooth extends from a longitudinal axis or center axis of a pipe. Sometimes referred to as screw thread taper, the screw threads are formed on a slightly conical profile. The conical profile aids alignment and allows torque tightening to make a fluid tight seal.

The threaded casing connection uses a threaded connection that involves a mill end pin connector and a field end pin connector engaging a threaded coupling. The threaded coupling can have a controlled phase or phase difference that limits the axial advancement of the mill end pin connector and field end pin connector past a coupling midpoint.

The threaded coupling can have a relief groove feature that reduces the hoop stress if the mill end pin end and field end pin end are not centered correctly at the coupling midpoint.

The threaded coupling can have a metal barrier also formed by the phase difference and length of the screw thread helix which limits the axial advancement of each pin connector.

Turning now to the Figures, FIG. 1A is a cross sectional view of the threaded casing connection according to one or more embodiments.

The casing threaded connection 10 can be used for engaging a first casing segment 200 with a second casing segment 202. In embodiments, the casing segments can be tubulars, tubing segments, or pipe segments.

The casing segments or tubing segments can be hard tubes with central bores, such as casing or drill pipe. In embodiments, the casing segments and the tubing segments can have an outer diameter from 0.5 of an inch to 30 inches.

The casing threaded connection 10 can have a mill end pin connector 16. The mill end pin connector 16 can have a mill end tubular end 18 and a mill end pin end.

The mill end pin connector 16 can have a bore, which can be used to convey fluids. The mill end pin connector can be made from steel, plastic, graphite composite, plastic composite, metal alloys, PVC, and combinations thereof.

The threaded connection 10 can have a threaded coupling 24 for receiving a mill end screw thread 22 creating coupling mill end teeth 32 from the mill end pin connector 16.

The mill end pin connector 16 can have a mill end screw thread 22. The mill end screw thread 22 can be formed on the cone shaped pin end or cylindrical shaped pin end. The mill end screw thread can create teeth, referred to herein as "pin mill end teeth" that can be identically spaced apart.

The threaded coupling 24 can have a mill end face 26. The threaded coupling 24 can receive a field end screw thread 42 creating field end teeth for the field end pin connector 36. The created teeth from the field end screw threads can be referred to herein as pin field end teeth to avoid confusion with coupling field end teeth 34, coupling mill end teeth 32 and pin mill end teeth.

The threaded coupling can have a field end face 28. The field end face 28 is on an opposite side to the mill end face 26.

The field end pin connector 36 can have a field end tubular end 38 and a field end screw thread 42 that create the pin field end teeth.

The threaded connection can have a center line 51.

In embodiments, the coupling field end teeth 34 can be formed helically along the bore extending from the field end face 28 to a location proximate a coupling midpoint.

A threaded coupling bore 30 is shown reducing in diameter from a first large diameter near the mill end face 26 to a small diameter near a coupling midpoint and then increasing to a second large diameter near the field end face 28.

FIG. 1B is a detailed view of the threaded connection according to one or more embodiments.

The threaded coupling 24 is shown in detail with the mill end pin connector 16 and the field end pin connector 36.

Each tooth of the coupling mill end teeth and the coupling field end teeth can have a load flank. The load flank of each tooth can be oriented in a direction opposite the load flank of an opposite tooth. The two load flanks can be mirror images of each other. The two load flanks enable load transfer from the load flank 60a and 60b to a corresponding load flank 46a and 46b shown in FIG. 2B.

The field end pin connector can have a field end pin end 40. The field end pin end 40 can be a cone shape reducing in diameter along a longitudinal axis toward the mill end tubular end or a cylindrical shape.

The mill end pin connector 16 can have a mill end pin end 20. The mill end pin end 20 can be a cone shape that reduces in diameter along a longitudinal axis toward the mill end tubular end or a cylindrical shape with a constant diameter along the center line toward the mill end tubular end.

FIG. 1C is a detailed view of the threaded connection according to one or more embodiments.

The threaded coupling 24 is shown, with the mill end pin connector 16 and the mill end pin end 20. The field end pin connector 36 is shown with the field end pin end 40.

FIG. 1D shows the threaded pipe connection having a first pipe segment 204 and a second pipe segment 206. The first and second pipe segments are joined by a threaded connection 10.

The threaded connection 10 can have the mill end pin connector 16, which can have a mill end tubular end 18 and a mill end pin end.

The threaded connection 10 can have a threaded coupling 24 for receiving a mill end screw thread 22 creating coupling to a plurality of mill end teeth 32 from the mill end pin connector 16.

The mill end pin connector 16 can have the mill end screw thread 22. The mill end screw thread 22 can be either cone shaped or cylindrical shaped on the pin end. The mill end screw thread can create a plurality of teeth, referred to herein as "pin mill end teeth" that can be identically spaced apart.

The threaded coupling 24 can have a mill end face 26.

The threaded coupling 24 can receive the field end screw thread 42 that creates a plurality of field end teeth 34 for the field end pin connector 36. The created plurality of teeth from the field end screw threads are referred to herein as "pin field end teeth" to avoid confusion with "coupling field end teeth" and to avoid further confusion with "coupling mill end teeth" and "pin mill end teeth" Four kinds of teeth engage in this invention.

The threaded coupling can have a field end face 28. The field end face 28 is on an opposite side to the mill end face 26.

The field end pin connector 36 can have a field end tubular end 38 and a field end screw thread 42 that create the plurality of "pin field end teeth".

The threaded connection can have a center line 51 over which is positioned the threaded coupling 24.

A threaded coupling bore 30 is shown reducing in diameter from a first large diameter near the mill end face 26 to a small diameter near a coupling midpoint and then increasing to a second large diameter near the field end face 28.

Figure 2A:
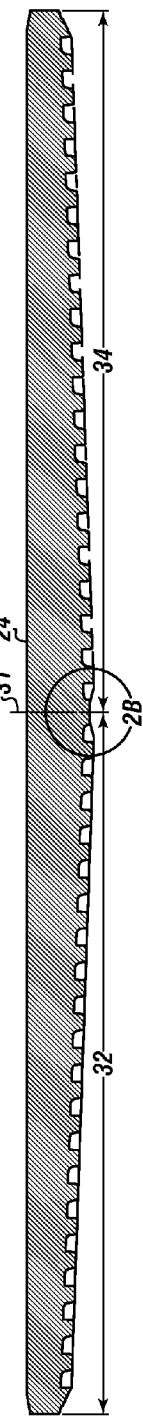
FIG. 2A is a cross section of the threaded connection according to one or more embodiments.

FIG. 2A is a cross section of the threaded coupling according to one or more embodiments.

The threaded coupling 24 is shown with coupling mill end teeth 32 formed helically along a bore extending from the mill end face to a location proximate the coupling midpoint 31.

The coupling mill end teeth 32 can receive the mill end screw thread from the mill end pin connector.

The threaded coupling 24 is shown with coupling field end teeth 34 formed helically along the bore extending from the field end face to a location proximate the coupling midpoint 31.

The coupling field end teeth 34 can receive the field end screw thread created from the field end pin connector.

Figure 2B:
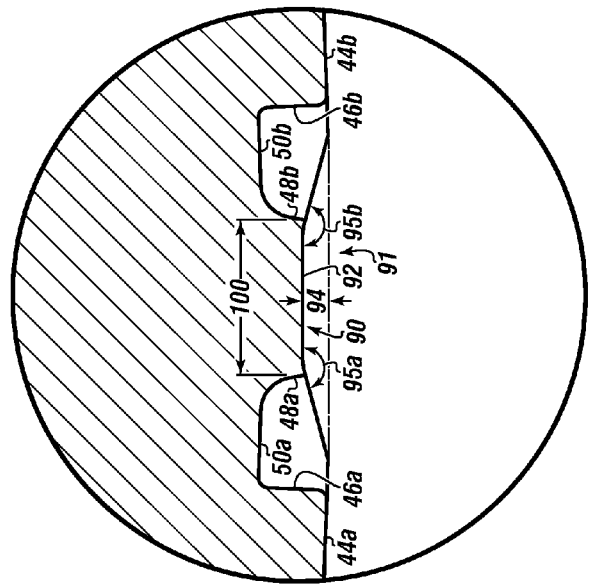
FIG. 2B is a detailed view of the relieve groove formed in the threaded connection.

FIG. 2B is a detailed view of the relieve groove formed in the threaded connection.

Each tooth can have a crest. Crest 44a and 44b are shown. Each tooth can have a load flank. Load flanks 46a and 46b are shown. Each tooth can have a stab flank. Stab flanks 48a and 48b are shown. Each tooth can have a root. Root 50a and root 50b are shown.

Each tooth can be tapered from the root to the crest from 1 degree to 30 degrees from the center line.

In embodiments, the coupling field end teeth can be mirror images of the coupling mill end teeth.

In embodiments, from 1 to 20 coupling field end teeth per inch can be used with the threaded connection.

In embodiments, from 1 to 20 coupling mill end teeth per inch can be used with the threaded connection.

In embodiments, not only can the shape of the coupling field end teeth be mirror images of the coupling mill end teeth, but the quantities of the coupling mill end teeth and the coupling field end teeth can be identical. In other embodiments, the threaded coupling can have more teeth than either the mill end pin connector teeth or the field end pin connector teeth.

A relief groove 90 can be formed at the coupling midpoint to relieve hoop stress between the teeth and the threaded coupling.

The relief groove 90 can be an isosceles trapezoid 91 with a flat top 92. The flat top 92 can have a width greater than 0.25 times each tooth lead.

In embodiments, the relief groove 90 can have a groove depth 94. The groove depth 94 can be from 25 percent to 120 percent of the distance between the root and the crest of each tooth.

In embodiments, the relief groove 90 can be an isosceles trapezoid 91 with a pair of obtuse angles 95a and 95b. Each obtuse angle can range from 105 degrees to 180 degrees.

In embodiments, a metal barrier 100 can be located at the coupling midpoint.

In embodiments, a phase difference between the coupling mill end teeth and the coupling field end teeth can be used, with the phase difference ranging from 0 degrees in phase to 359 degrees out of phase. In other embodiments, the phase difference can be 180 degrees.

The embodiments specifically control the phase difference, controlling the phase every time the threaded connection is formed.

Figure 3C:
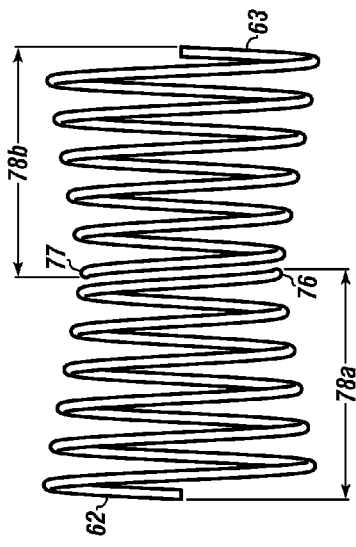
FIGS. 3A-3D depict two helical paths according to one or more embodiments.
Figure 3D:
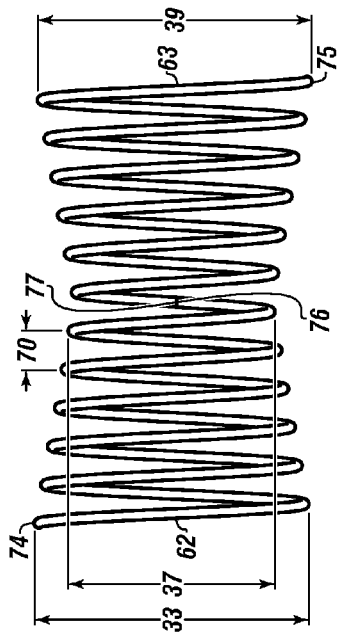
Figure 3A:
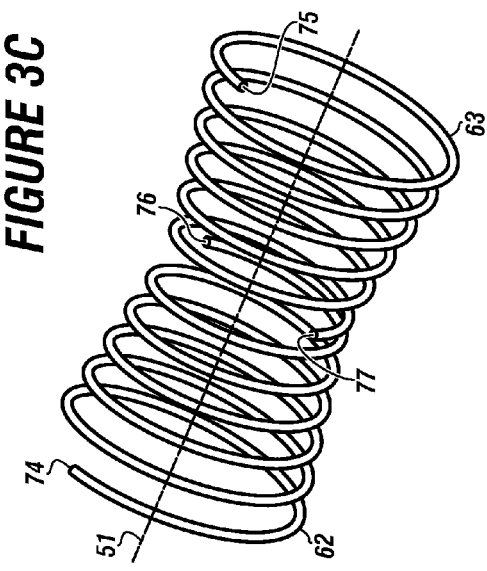
Figure 3B:
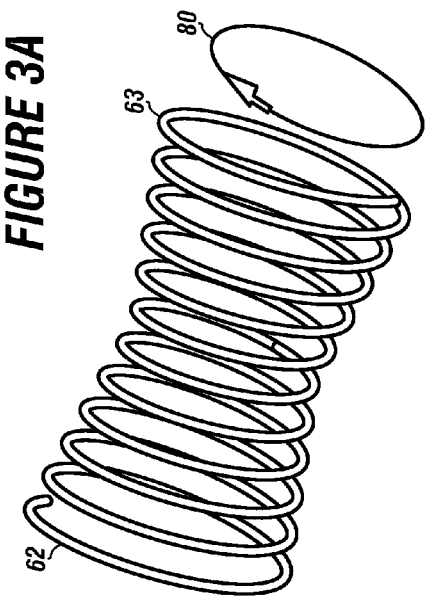

It should be noted that the metal barrier 100 can have a metal barrier width determined by computing a phase difference divided by 360 and then multiplied by lead and then increased by an integer of lead, which is shown in FIG. 3B. The lead can ranges from 0.1 of an inch to 1 inch.

In embodiments of the metal barrier, the term "the location proximate the coupling midpoint" can refer to a location that is from 0.125 times to 2 times the lead on either side of the coupling midpoint.

FIGS. 3A-3D depicts two helical paths formed by a cutting tool following a helical path on the threaded coupling.

FIG. 3A shows two helical paths. A first helical path 62 and a second helical path 63.

The first helical path 62 and the second helical path 63 depict a helical path right handedness 80. In other embodiments, the helical paths can both have left handedness.

FIG. 3B is a profile of FIG. 3A, which depicts the first helical path 62 reducing in diameter from a first large diameter 33 at the mill end face to a small diameter 37 at a coupling midpoint.

The second helical path 63 increases from the small diameter 37 to a second large diameter 39 at the field end face.

The first helical path 62 can have a mill end variable end point 76. The mill end variable end point can be in more than one location according to the embodiments. The mill end variable end point can be at a 12 o'clock position, a 3 o'clock positions, a 6 o'clock position, or even a 9 o'clock position. The mill end variable end point can change depending on if the helical paths are in phase or out of phase. Positions in between the clock positions already listed can be used as well as the mill end variable end point. Other positions can be defined by the phase difference.

The second helical path 63 can have a field end variable end point 77. The field end variable end point can be in more than one location according to the embodiments. The field end variable end point can be at a 12 o'clock position, a 3 o'clock positions, a 6 o'clock position, or even a 9 o'clock position. The field end variable end point can change depending on if the helical paths are in phase or out of phase. Positions in between the clock positions already listed can be used as well as the field end variable end point. Other positions can be defined by the phase difference.

The first helical path 62 can have a mill end face start point 74. The mill end face start point 74 can be formed adjacent the mill end face. The mill end face start point can refer to a beginning location of the helical path proximate the mill end face.

The second helical path 63 can have a field end face start point 75. The field end face start point 75 can be formed adjacent the field end face 28. The field end face start point can refer to a beginning location of the helical path proximate the field end face.

As an example, for a 6 inch outer diameter pipe, the first large diameter 33 at the mill end face can be an inner diameter of 5 inches reducing to the small diameter 37 of 3 inches and then increasing to the second large diameter of 5 inches at the field end face.

The embodiments enable both helical paths to have the same identical handedness, such as both helical paths are right handed or both helical paths are left handed.

A lead 70 between the grooves of the helical paths is shown. The lead 70 ranges from 0.1 of an inch to 1 inch for both of the helical paths. In phase both helical paths can have an identical lead between both helical paths.

FIG. 3C shows a first helical path 62 with a mill end variable end point 76 and a second helical path 63 with a field end variable end point 77.

The first helical path 62 and the second helical path 63 are not continuations of the same helical path.

The first and second helical paths are not in flush contact at the coupling midpoint.

The two helical paths are at the center midpoint of the bore, but not at the same location in three dimensional spaces.

The mill end face start point 74 can be formed on or near the mill end face.

The field end face start point 75 can be formed on or near the field end face.

FIG. 3D is a profile of FIG. 3C, which shows the first helical path 62 and the second helical path 63.

In this embodiment, the helical path lengths 78a and 78b are identical.

The mill end variable end point 76 and the field end variable end point 77 are depicted.

In embodiments of the threaded connection, the width of the metal barrier can have a phase difference divided by 360 multiplied by lead plus an integer of lead. The integer can be zero in some instances. Integer can be a number such as 1, 2, 3, 4, or 5. Lead can be 0, 1, 2, 3, 4, and 5.

In an embodiment, the screw threads can be wedge threads with helical paths having a defined variable lead. Both helical paths can be identical for the wedge thread embodiment such as those sold by TENARIS HYDRIL™ with offices in Houston, Tex.

Figure 4:
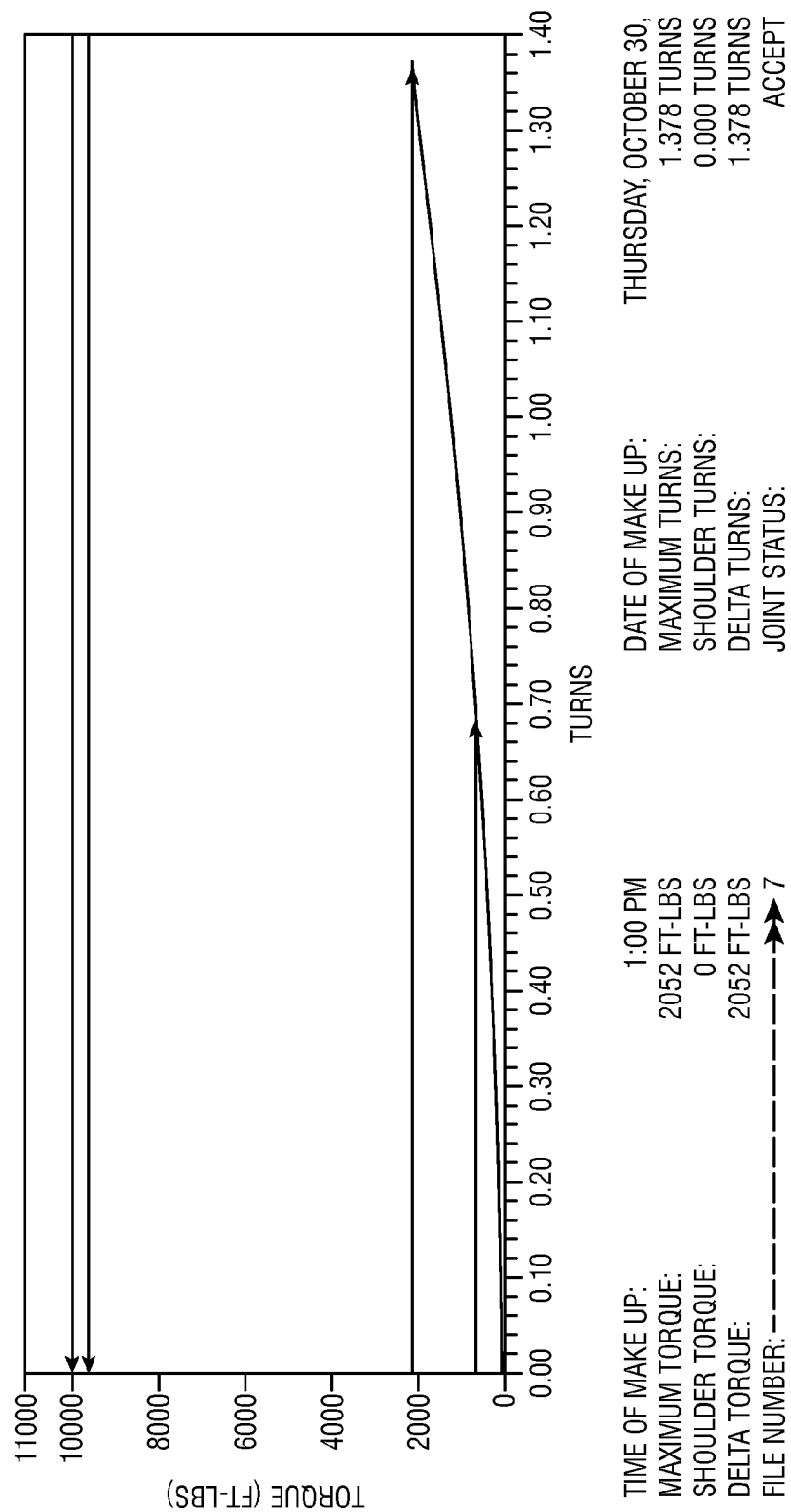
FIG. 4 depicts a graph showing the torque required to position the mill end pin connector.

FIG. 4 depicts a graph showing the torque in foot-pounds required to position the mill end pin connector 0.7 turns past the center position of the coupling.

The graph shows on the x-axis the number of turns of a pin connector into a threaded coupling.

The graph shows on the y-axis torque in foot pounds.

The graphs shows that the torque in foot-pounds required to position a mill end pin connector 0.7 turns past the center position of the coupling is about 500 ft-lbs.

At 0.70 turns the connection is properly centered.

The torque to correctly position the field end pin end would be roughly identical to the torque at 0.70 turn. At 1.40 turns the pin connector has been rotated 0.70 turns past the center.

The anti-rotation feature of this invention, that is the two spirals, creates torque resistance roughly four times higher than the torque necessary to center the mill end pin connector on the threaded coupling.

The threaded casing connection or threaded tubing connection then demonstrates a leak resistance when the mill end pin end and the field end pin end meet as close as possible to the coupling midpoint.

The slope of the line (torque/turn) is 500 ft-lbs/0.7 turns up to 0.7 turns and 1500 ft-lbs/0.7 turns.

The line rising from 0 to 2000 ft-lbs of torque represent torque over time by turn as applied to the pin connector using the invention, that is, the ability of the invention to sustain torque by quantity of turns.

The graph a time of make up of the threaded coupling to the connector of 1:00 pm and a date of make up.

The graph shows a maximum torque of 2052 ft-pounds with a maximum number of turns as 1.378.

The delta torque is also 2052 ft-lbs with delta turns at 1.378 turns. The joint status is shown as "accepted" which means the make up test was successful.

This graph was made using a make/break test on 5.5 inch in diameter grade Q125 steel pipe.

In embodiments, the threaded casing connection or threaded pipe connection each can have a make-up torque of 1500 ft-lbs to 110,000 ft-lbs. The pipe connection can be formed for a plurality of tubular pipe bodies having a wall thickness of from 0.1 inches to 1 inch and a tensile load capacity of 50,000 lbs and 2.0 million lbs.

While these embodiments have been described with emphasis on the embodiments, it should be understood that within the scope of the appended claims, the embodiments might be practiced other than as specifically described herein.

What is claimed is:

1. A threaded casing connection for coupling adjacent casing segments together to form a casing string, the casing segments are supported by either a drilling rig, a production rig, a workover rig or a wellhead for placement in a wellbore, the threaded casing connection comprises:
    a first casing segment;
    a second casing segment, wherein each of the casing segments has a first end, a second end, and a passage therethrough, further wherein each of the casing segments has a wall thickness of 0.1 inch to 1 inch; and
    a threaded connection for engaging the first casing segment with the second casing segment, the threaded connection comprising:
        a mill end pin connector comprising:
            a mill end casing end;
            a mill end pin end having either (i) a cone shape reducing in diameter along a longitudinal axis of the mill end pin connector toward the mill end casing end or (ii) a cylindrical shape; and
            a mill end screw thread formed on the mill end pin end creating a plurality of pin mill end teeth that are identically spaced apart, each pin mill end tooth having a root and each mill end screw thread forming a helical path;
        a threaded coupling receiving the plurality of pin mill end teeth from the mill end pin connector, the threaded coupling comprising:
            a coupling mill end face;
            a coupling field end face;
            a threaded coupling bore reducing in diameter from a first large diameter at the coupling mill end face to a small diameter at a coupling midpoint and then increasing to a second large diameter at the coupling field end face;
            a plurality of coupling mill end teeth formed helically along the threaded coupling bore from the coupling mill end face to the coupling midpoint, the plurality of coupling mill end teeth for receiving the plurality of pin mill end teeth; and
            a plurality of coupling field end teeth formed helically along the threaded coupling bore from the coupling field end face to the coupling midpoint, wherein the coupling field end teeth are mirror images of the coupling mill end teeth; and
                wherein the roots of the coupling mill end teeth and the coupling field end teeth meet at a coupling midpoint and the roots of the coupling mill end teeth and the coupling field end teeth are helical paths in phase thereby forming a single helical groove to limit axial advancement and rotation past the coupling midpoint; and
        a field end pin connector comprising:
            a field end casing end;
            a field end pin end having either (i) a cone shape reducing in diameter along a longitudinal axis of the field end pin connector toward the field end casing end or (ii) a cylindrical shape; and
            a field end screw thread formed on the field end pin end creating a plurality of pin field end teeth, each pin field end tooth having a root and each field end screw thread forming a helical path, the pin field end teeth being identically spaced apart, wherein load flanks for each of the mill end teeth are oriented in a direction opposite the load flanks of each of the field end teeth, with the two load flanks being mirror images of each other, enabling load transfer from each load flank to a corresponding load flank, and wherein the pin mill end teeth are mirror images of the pin field end teeth and are asymmetric in cross-section; and
        wherein the threaded casing connection couples adjacent casing segments together to form a casing string capable of supporting at least 10,000 pounds of load without substantially deforming.

2. The threaded casing connection of claim 1, the threaded connection having the plurality of pin mill end teeth formed along a first helical path and the plurality of pin field end teeth formed along a second helical path, wherein each of the helical paths comprise:
    a lead for each tooth of the plurality of mill end teeth and each tooth of the plurality of field end teeth that ranges from 0.1 of an inch to 1 inch;
    a mill end face start point formed on the mill end face;
    a field end face start point formed on the field end face;
    a mill end variable end point;
    a field end variable end point;
    helical path lengths that are identical; and
    helical path handedness.

3. The threaded casing connection of claim 1, the threaded connection comprising a relief groove with a groove depth from 25 percent to 120 percent of the distance between a root and a crest of each tooth of the plurality of mill end teeth and field end teeth.

4. The threaded casing connection of claim 1, wherein the location proximate the coupling midpoint is a location that is from 0.125 times to 2 times a lead on either side of the coupling midpoint.

5. The threaded casing connection of claim 1, wherein each of the casing segments are liner segments.

6. A threaded pipe connection for coupling adjacent pipe segments together to form a tubing string, the pipe segments are supported by either a drilling rig, a production rig, a workover rig or a wellhead for placement in a wellbore, the threaded pipe connection comprising:
    a first pipe segment;
    a second pipe segment, wherein each of the pipe segments has a first end, a second end, and a passage therethrough, further wherein each of the pipe segments has a wall thickness of 0.1 inch to 1 inch; and
    a threaded connection for engaging the first pipe segment with the second pipe segment, the threaded connection comprising:
        a mill end pin connector comprising:
            a mill end tubing segment end;
            a mill end pin end having either (i) a cone shape reducing in diameter along a longitudinal axis of the mill end pin connector toward the mill end tubing segment end or (ii) a cylindrical shape; and
            a mill end screw thread formed on the mill end pin end creating a plurality of pin mill end teeth that are identically spaced apart, each pin mill end tooth having a root and each mill end screw thread forming a helical path;

a threaded coupling receiving the plurality of pin mill end teeth from the mill end pin connector, the threaded coupling comprising:
   a coupling mill end face;
   a coupling field end face;
   a threaded coupling bore reducing in diameter from a first large diameter at the coupling mill end face to a small diameter at a coupling midpoint and then increasing to a second large diameter at the coupling field end face;
   a plurality of coupling mill end teeth formed helically along the threaded coupling bore from the coupling mill end face to the coupling midpoint, the plurality of coupling mill end teeth for receiving the plurality of pin mill end teeth; and
   a plurality of coupling field end teeth formed helically along the threaded coupling bore from the coupling field end face to the coupling midpoint, the coupling field end teeth are mirror images of the coupling mill end teeth; and
a field end pin connector comprising:
   a field end tubing segment end;
   a field end pin end having either (i) a cone shape reducing in diameter along a longitudinal axis of the field end pin connector toward the field end tubing segment end or (ii) a cylindrical shape; and
   a field end screw thread formed on the field end pin end creating a plurality of pin field end teeth each pin field end tooth having a root and each field end screw thread forming a helical path, the pin field end teeth being identically spaced apart and adapted to engage the plurality of pin mill end teeth, wherein load flanks for each of the mill end teeth are oriented in a direction opposite the load flanks of each of the field end teeth, with the two load flanks being mirror images of each other, enabling load transfer from each load flank to a corresponding load flank, and wherein each pin mill end tooth is a mirror image of each pin field end tooth and are asymmetric in cross-section; and
wherein the threaded pipe connection couples adjacent tubing segments together to form a tubing string capable of supporting at least 10,000 pounds of load without deforming; and
wherein the roots of the coupling mill end teeth and the coupling field end teeth meet at a coupling midpoint and the roots of the coupling mill end teeth and the coupling field end teeth are helical paths in phase thereby forming a single helical groove to limit axial advancement and rotation past the coupling midpoint.

7. The threaded pipe connection of claim 6, the threaded connection having the plurality of pin mill end teeth and the plurality of pin field end teeth formed along a first helical path and a second helical path, wherein each of the helical paths comprise:
   a lead for each tooth of the mill end teeth and each tooth of the field end teeth that ranges from 0.1 of an inch to 1 inch;
   a mill end face start point formed on the mill end face;
   a field end face start point formed on the field end face;
   a mill end variable end point;
   a field end variable end point;
   helical path lengths that are identical; and
   helical path handedness.

8. The threaded pipe connection of claim 6, the threaded connection comprising a relief groove with a groove depth from 25 percent to 120 percent of the distance between a root and a crest of each tooth.

9. The threaded pipe connection of claim 6, wherein the location proximate the coupling midpoint is a location that is from 0.125 times to 2 times the lead on either side of the coupling midpoint.

\* \* \* \* \*